(12) United States Patent
Pedersen

(10) Patent No.: US 7,775,753 B2
(45) Date of Patent: Aug. 17, 2010

(54) TRANSPORTATION SYSTEM FOR A WIND TURBINE COMPONENT, VEHICLE FOR A TRANSPORTATION SYSTEM, DISPLACEMENT SYSTEM, METHOD OF ESTABLISHING A TRANSPORTATION OR DISPLACEMENT AND USE THEREOF

(75) Inventor: Gunnar Storgaard Pedersen, Skjern (DK)

(73) Assignee: Vestas Wind Systems A/S (DK)

( * ) Notice: Subject to any disclaimer, the term of this patent is extended or adjusted under 35 U.S.C. 154(b) by 677 days.

(21) Appl. No.: 10/556,987

(22) PCT Filed: May 15, 2003

(86) PCT No.: PCT/DK03/00327

§ 371 (c)(1),
(2), (4) Date: Jan. 12, 2007

(87) PCT Pub. No.: WO2004/101313

PCT Pub. Date: Nov. 25, 2004

(65) Prior Publication Data

US 2007/0145181 A1    Jun. 28, 2007

(51) Int. Cl.
*B60P 3/40* (2006.01)
*B66C 1/66* (2006.01)
*F03D 11/00* (2006.01)

(52) U.S. Cl. .............................. 410/44; 410/48; 410/80; 280/404

(58) Field of Classification Search ...................... 410/2, 410/44, 45, 48, 53, 80; 280/404
See application file for complete search history.

(56) References Cited

U.S. PATENT DOCUMENTS

| | | | | | |
|---|---|---|---|---|---|
| 1,996,695 | A | * | 4/1935 | Bigley, Jr. | 410/45 |
| 2,594,586 | A | * | 4/1952 | Ries | 280/43.24 |
| 2,670,166 | A | * | 2/1954 | Applegate | 410/44 |
| 2,725,241 | A | * | 11/1955 | Leonard, Jr. | 410/44 |
| 2,841,094 | A | * | 7/1958 | Schumacher | 410/53 |
| 3,018,129 | A | * | 1/1962 | Culver | 410/44 |
| 3,052,440 | A | * | 9/1962 | Bauer et al. | 410/44 |
| 3,392,857 | A | * | 7/1968 | Tantlinger | 414/458 |
| 3,616,959 | A | * | 11/1971 | Remesy et al. | 220/647 |
| 3,834,111 | A | * | 9/1974 | Acker et al. | 52/745.02 |

(Continued)

FOREIGN PATENT DOCUMENTS

DE        100 63 136        1/2002

(Continued)

OTHER PUBLICATIONS

International Search Report; PCT/DK03/00327; May 12, 2003.

*Primary Examiner*—Patricia L Engle
(74) *Attorney, Agent, or Firm*—St. Onge Steward Johnston & Reens LLC

(57) ABSTRACT

A transportation system for a wind turbine component such as a wind nacelle or a section of a tubular wind turbine tower is provided, including a wind turbine component with a rigid structure. The system further includes at least two frame elements directly or indirectly connected to the rigid structure of the wind turbine component, where the at least two frame elements define a space enclosing the component. A a displacement system and a method of establishing a transportation or displacement system for a wind turbine component are also provided.

25 Claims, 13 Drawing Sheets

U.S. PATENT DOCUMENTS

Figure 1:
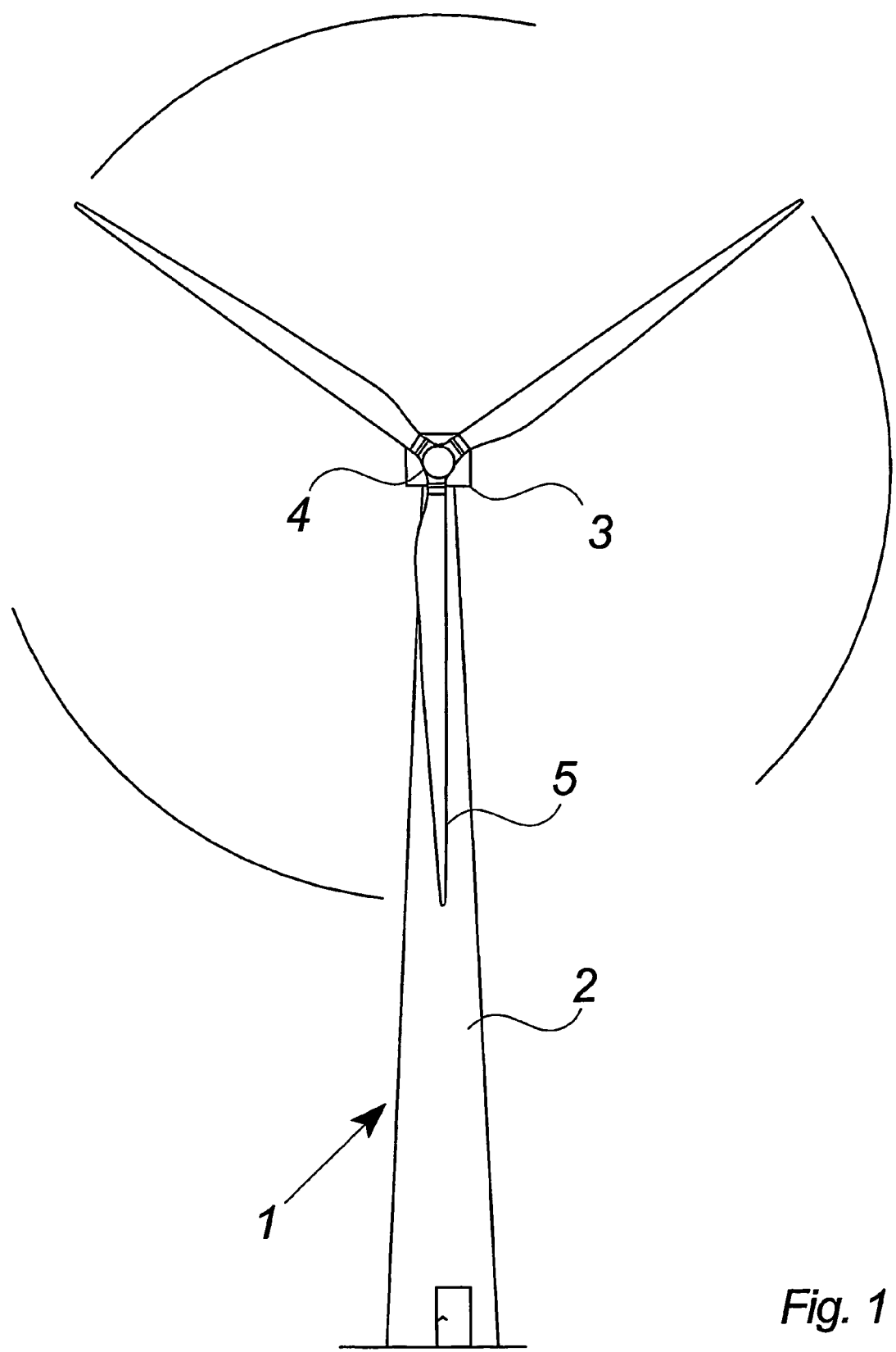

| | | | |
|---|---|---|---|
| 3,929,241 A * | 12/1975 | Putnam | 414/458 |
| 4,199,298 A * | 4/1980 | Webre et al. | 414/458 |
| 4,231,709 A * | 11/1980 | Corsetti | 414/458 |
| 6,298,536 B1 * | 10/2001 | Rossway et al. | 29/281.1 |
| 6,334,746 B1 * | 1/2002 | Nguyen et al. | 410/44 |
| 6,821,066 B2 * | 11/2004 | Wehrli | 410/32 |
| 6,877,581 B2 * | 4/2005 | Badr et al. | 180/311 |
| 6,957,822 B2 * | 10/2005 | Douglas et al. | 280/416.1 |
| 7,112,029 B1 * | 9/2006 | Neatherlin | 414/458 |
| 7,594,785 B2 * | 9/2009 | Wobben | 410/53 |
| 2003/0175089 A1 * | 9/2003 | Almind | 410/2 |
| 2004/0135344 A1 * | 7/2004 | Douglas et al. | 280/404 |
| 2005/0123382 A1 * | 6/2005 | Christensen et al. | 414/373 |

FOREIGN PATENT DOCUMENTS

| | | |
|---|---|---|
| DE | 102 00 401 | 7/2003 |
| EP | 1 336 755 | 8/2003 |
| JP | 2 59776 | 2/1990 |
| WO | WO 02/083523 | 10/2002 |

* cited by examiner

TRANSPORTATION SYSTEM FOR A WIND TURBINE COMPONENT, VEHICLE FOR A TRANSPORTATION SYSTEM, DISPLACEMENT SYSTEM, METHOD OF ESTABLISHING A TRANSPORTATION OR DISPLACEMENT AND USE THEREOF

CROSS-REFERENCE TO RELATED APPLICATIONS

The present application is a 371 of PCT/DE03/00327 filed on May 15, 2003.

BACKGROUND OF THE INVENTION

The invention relates to a transportation system for a wind turbine component a displacement system, and a method of establishing a transportation or displacement system and use hereof.

DESCRIPTION OF THE RELATED ART

Typically, wind turbine components such as nacelles or tower sections are transported to the mounting site by means of large trucks capable of carrying the relevant load on a standard trailer. Before the truck transportation, the components may be transported from the central wind turbine production plant by ship or train.

As the wind turbine components are quite large and heavy as well as quite irregular in shape, the transportation usually requires a lot of transportation space e.g. on the ship deck. Further, the components often involve special handling and handling equipment due to the irregular shape.

One of the objects of the invention is to establish transportation for wind turbine components without the above-mentioned disadvantage.

It is another object of the invention to create a standardised transportation form in which the natural and rigid strength of the components are used in order to enhance the transportation efficiency.

A further object of the invention is to create a transportation form that may enter a system performing transportation on the same conditions as other standardized goods.

THE INVENTION

The invention relates to a transportation system for a wind turbine component such as a wind turbine nacelle or a section of a tubular wind turbine tower where at least one standardisation means or frame element is directly or indirectly connected to the rigid structure of said wind turbine component, and where said at least one standardisation means or frame element defines a space enclosing said component.

Hereby, a transportation system for wind turbine components is established without the above-mentioned disadvantage. Especially, it is advantageous that the standardisation is achieved without enclosing the wind turbine component in separate outer transportation walls.

In an aspect of the invention, said rigid structure comprises the bolted, welded or molded machine frame of a nacelle including horizontal, vertical and/or diagonal beams. Hereby, it is possible to establish a rigid transportation system without using separate outer transportation walls.

In another aspect of the invention, said rigid structure comprises a tubular or similar structure of a wind turbine nacelle or tower section.

In a further aspect of the invention, said system comprises two standardisation means or frame elements mounted in opposite ends of the wind turbine component. Hereby, it is possible to enclose and suspend the component in a standardized space e.g. allowing the component to be stacked with other standardized transport systems.

In a further aspect of the invention, said standardisation means defines a space corresponding to a standardized container in length, such as the length of 20 to 40 feet containers or a standard oversized shipping container. In an even further aspect of the invention, said standardisation means defines a space corresponding to a standardized container in length and width, such as the length and width of 20 to 40 feet containers or a standard oversized shipping container. Hereby, it is possible to transport the component as a standard transportation system together with other transportation systems e.g. on a ship or a train. Especially on a ship it is important that the transported items are standardized in order to efficiently use the storage space of the ship. Further, the standardized size allows the transportation system to be handled by the normal handling equipment such as cranes and lashing equipment. Even further, the wind turbine components may more efficiently be stacked temporarily in storage facilities e.g. in connection with the production plant before transportation.

In another aspect of the invention, said standardization means or frame element includes an upper and lower standardization beam. Hereby, it is possible to establish a space defined by upper and lower borders being said upper and lower standardization beams. The upper and lower beams of the transportation system may be positioned against and used as contact surface for other transportation systems e.g. similar transportation systems for wind turbine components or standard shipping containers.

It shall be emphasised that the upper and lower border/beams define a space that encloses the wind turbine component totally ensuring that other transportation systems lay against the upper and lower beams and not the component.

In an aspect of the invention, said standardisation means comprises connection means in connecting to the wind turbine component. Hereby, an advantageous embodiment of the invention has been achieved.

In a further aspect of the invention, said connection means are at least three connection arms or a circular lift adaptor. Hereby it is possible to achieve the necessary rigidity in the connection between the nacelle and the standardization means.

In an even further aspect of the invention, said connection means are directly connected to the nacelle machine frame e.g. with adaptors or furnishings and bolts, or indirectly e.g. through the hub opening or the yaw foundation of the nacelle. Hereby, it is easy and quick to establish the connection between the nacelle and the standardization means at the beginning of the transportation. Further, it is easy and quick to remove the means at the end of the transportation.

The invention also relates to at least one standardisation means being directly or indirectly connected to the rigid structure of said wind turbine component, said at least one standardisation means further being connected to said trailers in one or more flexible connections, where said at least one standardisation means defines a space enclosing said component.

Hereby, a preferred embodiment of the invention is achieved.

In an aspect of the invention, said one or more flexible connections comprise hinged connections between the standardisation means and the two trailers. Hereby, a preferred embodiment of the invention is achieved.

In a further aspect of the invention, said one or more flexible connections further comprise at least one lift actuator. Hereby, a preferred embodiment of the invention is achieved.

In an even further aspect of the invention, said at least one lift actuator include a first lift actuator flexibly connecting the trailer with the upper section of said at least one standardisation means.

In another aspect of the invention, said first lift actuator includes gripping means with gripping jaws for gripping said standardisation means. Hereby, it is easy and quick to establish the connection between the standardization means and the vehicles at the beginning of the transportation. Further, it is easy and quick to remove the means at the end of the transportation simply by releasing the grip.

In an aspect of the invention, said gripping means with gripping jaws engages with an inner gripping edge of said circular lift adaptor or the lower edge of the upper standardization beam. Hereby, the standardization means such as the lift adaptor is firmly suspended in a vertical plane ensuring that the means do not move vertically during the transportation.

In a further aspect of the invention, said first lift actuator is suspended with a vertical lift frame. The vertical lift frame ensures that the lift actuator is not pressed downwards e.g. due to vibrations from the transportation.

In another aspect of the invention, said at least one lift actuator includes a second lift actuator connected at one end to said lift frame and ends in a contact face at the opposite end. The contact face is forced against the standardization means ensuring a firm and durable connection between the vehicle and the means.

In an aspect of the invention, said contact face engages with an inner surface of said circular lift adaptor or the lower edge of the upper standardization beam. Hereby, a preferred embodiment of the invention is achieved.

The invention also relates to a displacement system for a wind turbine component such as a wind turbine nacelle or a section of a tubular wind turbine tower, said system comprising gripping means for engaging with a wind turbine component including a rigid structure, displacement means for displacing said wind turbine component in which said engagement and displacement means are connected, where said displacement system further being connected to at least one standardisation means, said standardisation means also being directly or indirectly connected to the rigid structure of said wind turbine component, e.g. in one or more flexible connections, where said at least one standardisation means defines a space enclosing said component.

With the displacement system it is possible to displace a wind turbine component in an advantageous way.

In an aspect of the invention, said at least one hydraulic actuator suspending one or more of the wheels in relation to the trailer frame such as the suspension system of a trailer or vehicle. Hereby it is possible to displace the wind turbine component by using integrated hydraulic systems of the trailers e.g. the suspension system allowing the trailer frame to be lowered in relation to the wheels or lift actuators forcing the wind turbine component in an upward direction.

The invention also relates to a method of establishing a transportation or displacement system for a wind turbine component such as a wind turbine nacelle or a section of a tubular wind turbine tower, said method comprising the steps of positioning at least one standardisation means in front of the wind turbine component, and directly or indirectly connecting said at least one standardisation means to the rigid structure of said wind turbine component.

Hereby it is possible to establish a transportation or displacement method for the wind turbine component that is especially advantageous.

FIGURES

Figure 2:
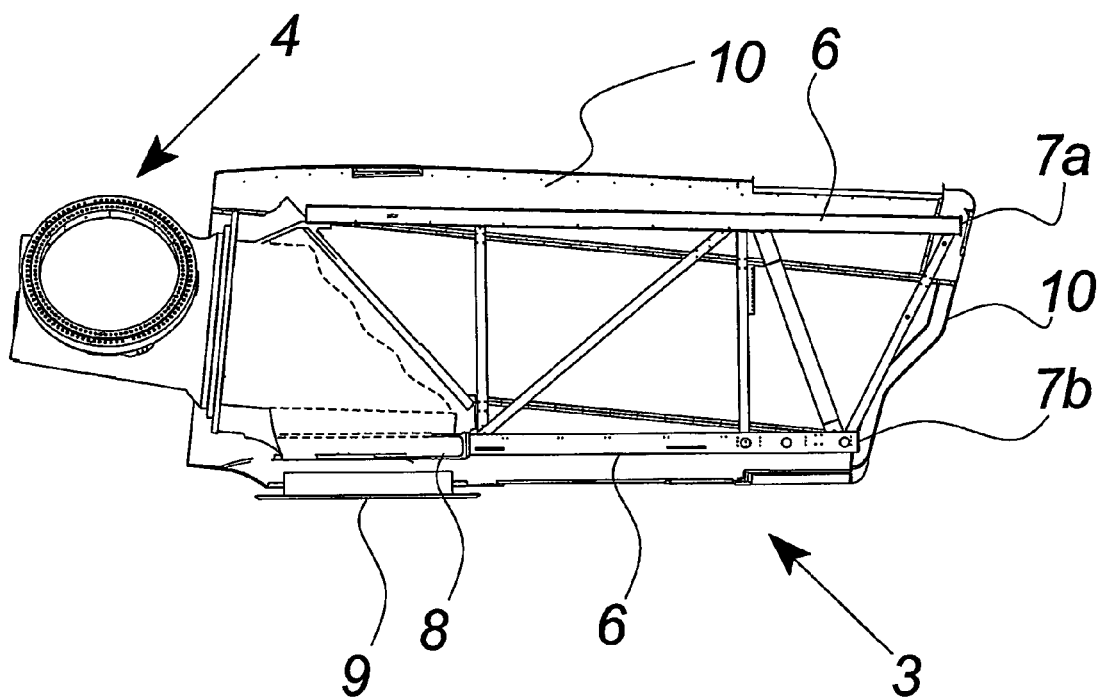
Figure 3:
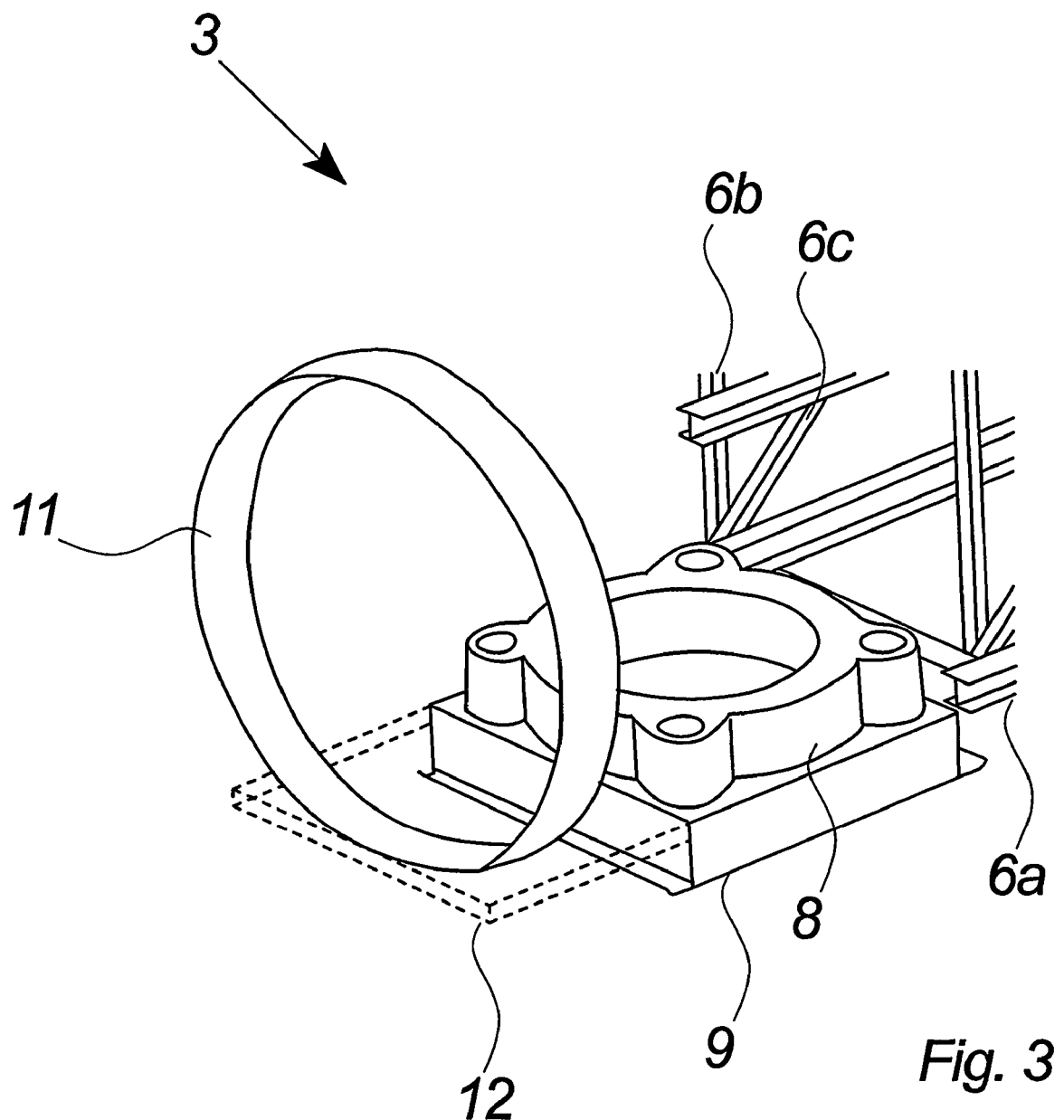
Figure 4:
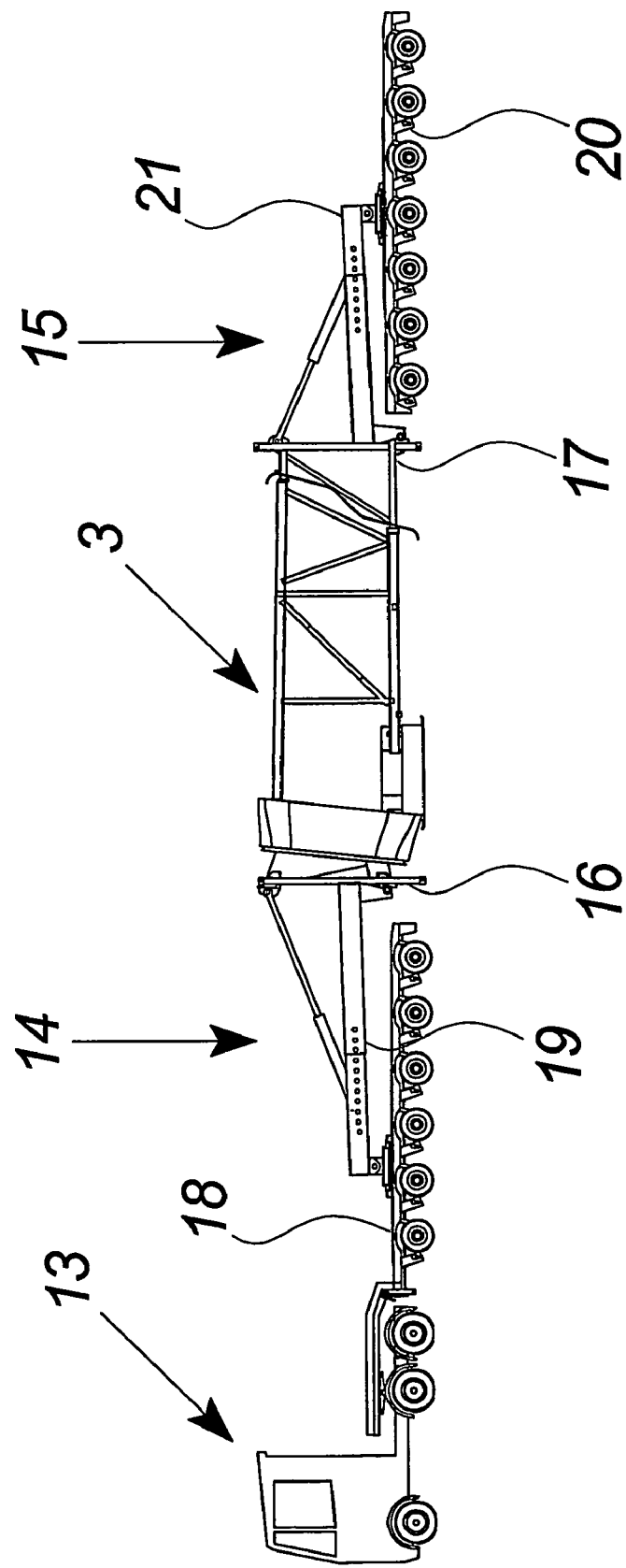
Figure 5A:
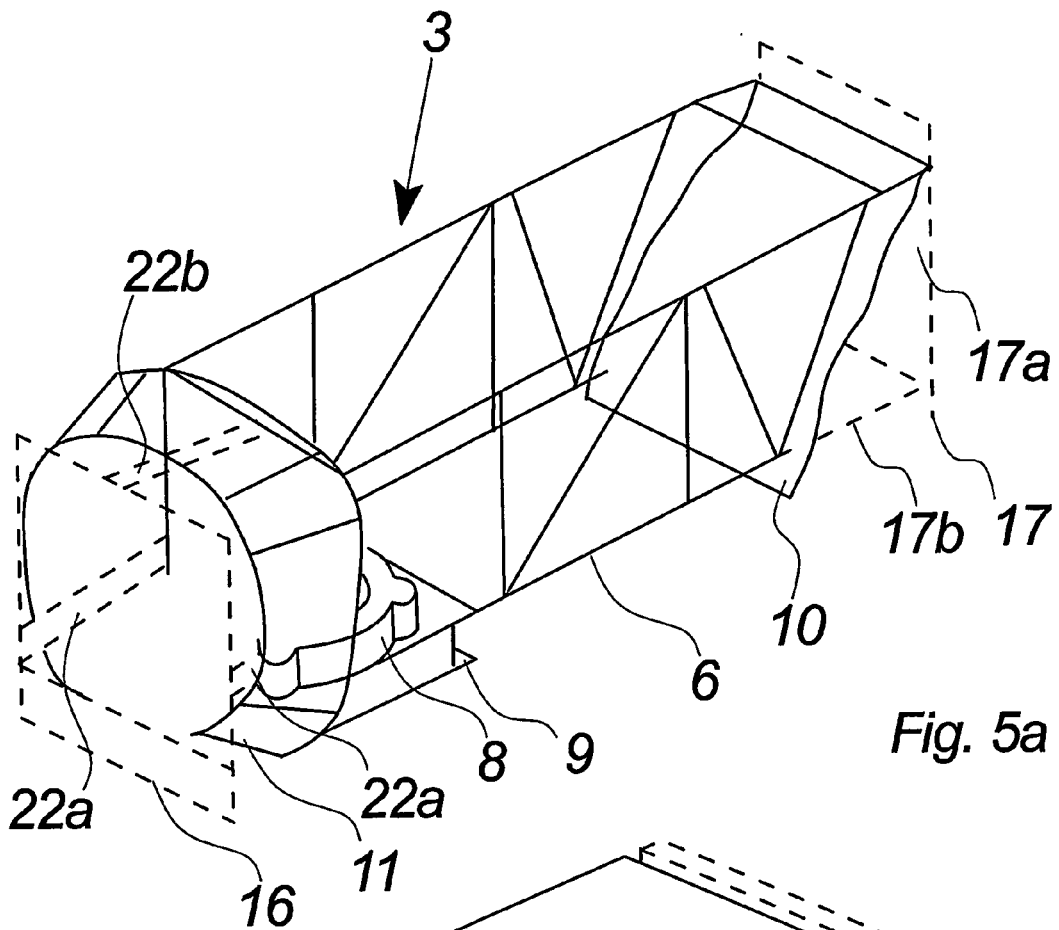
Figure 5B:
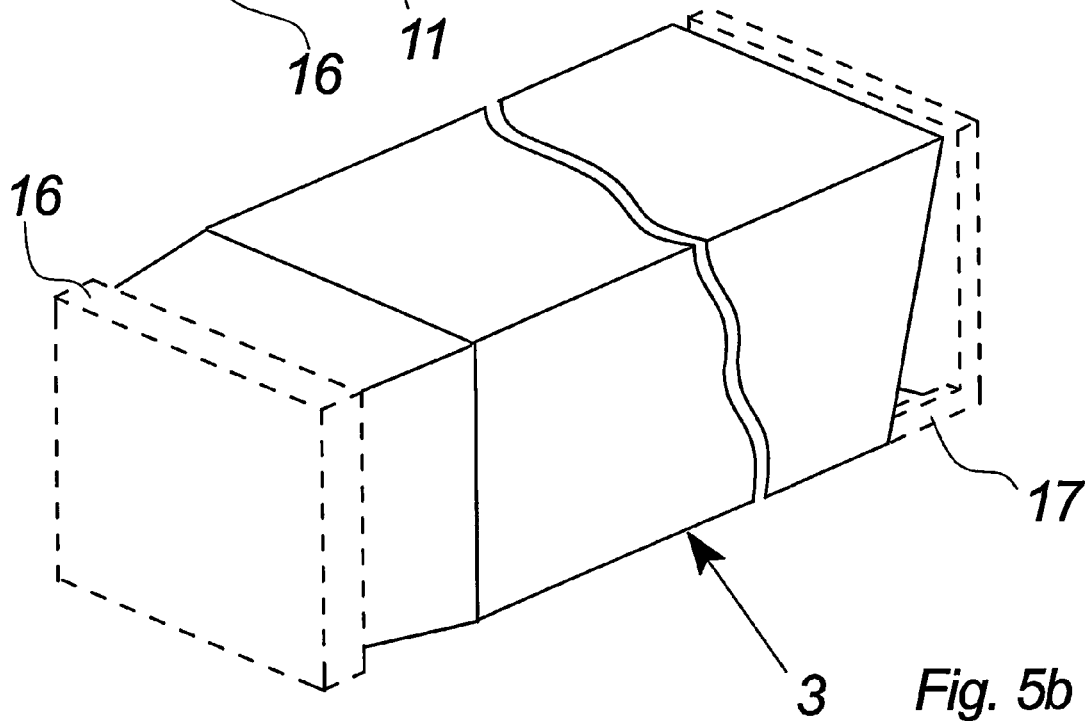
Figure 5C:
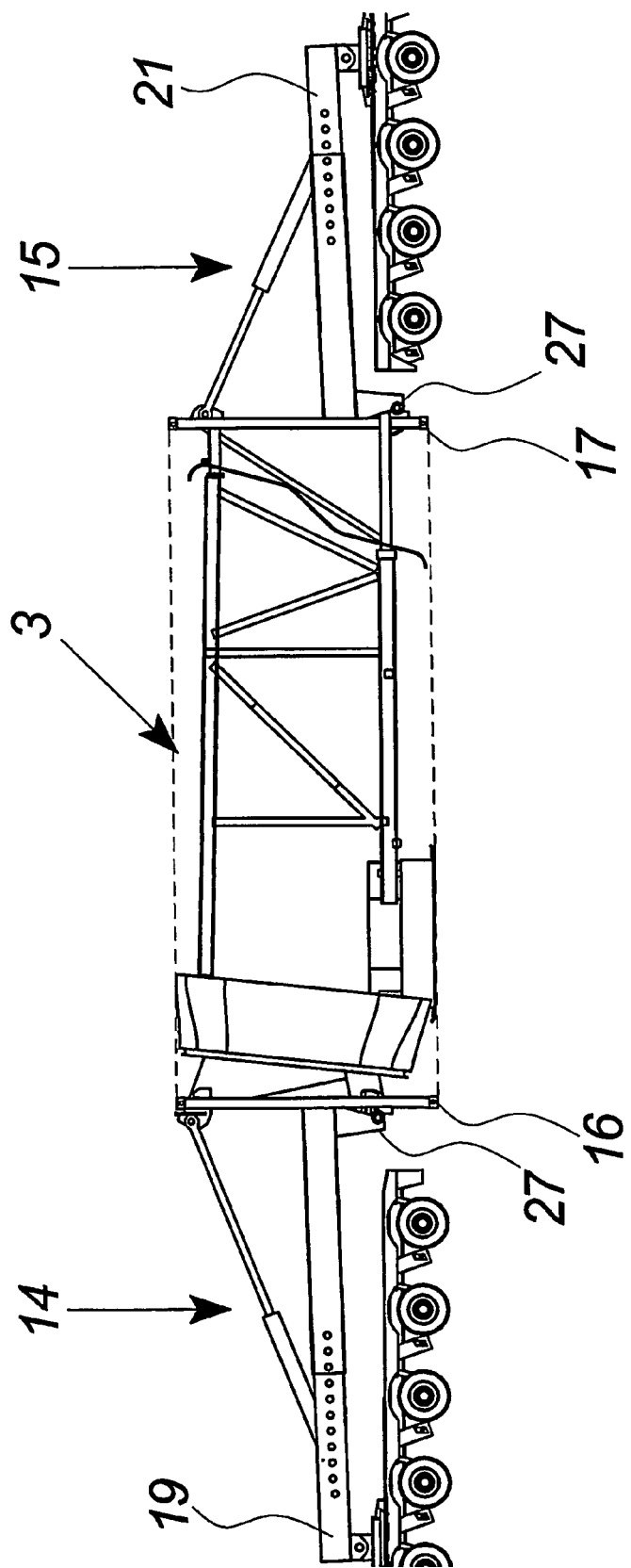
Figure 6:
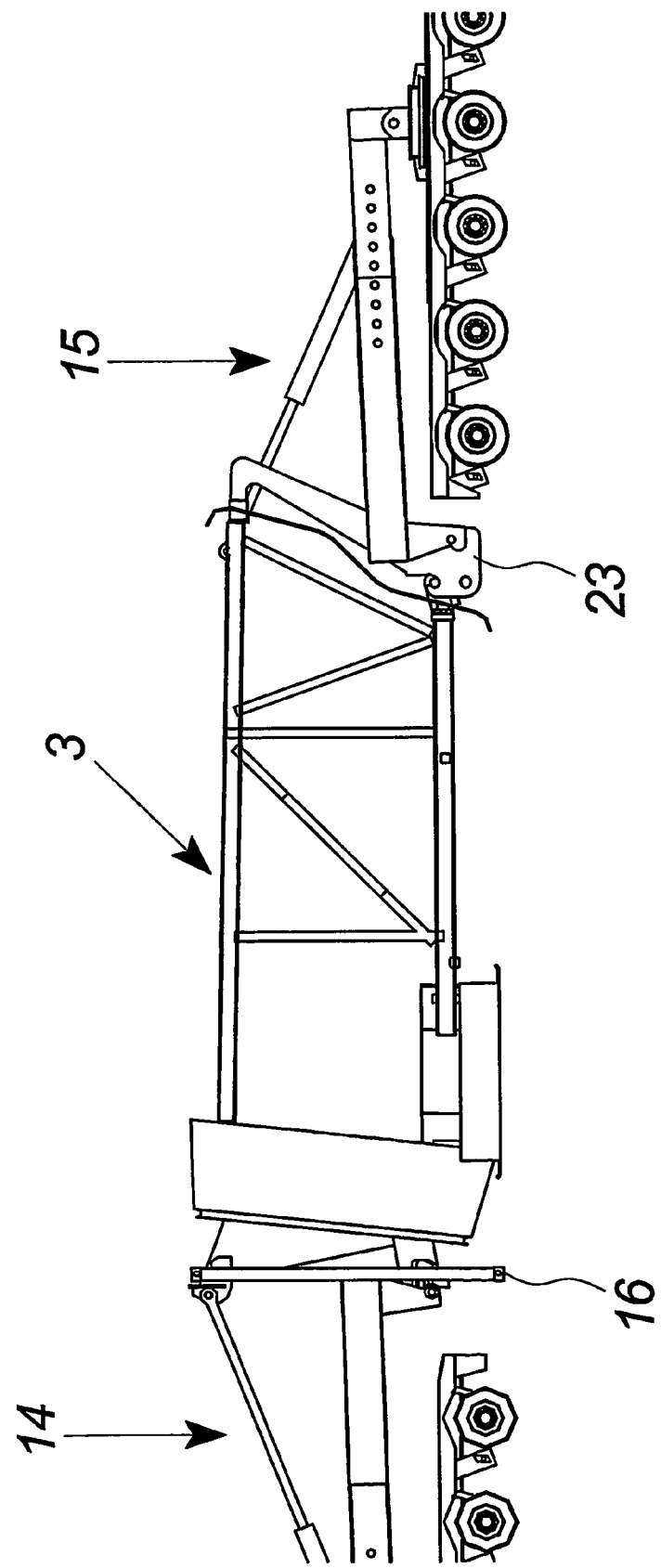
Figure 7:
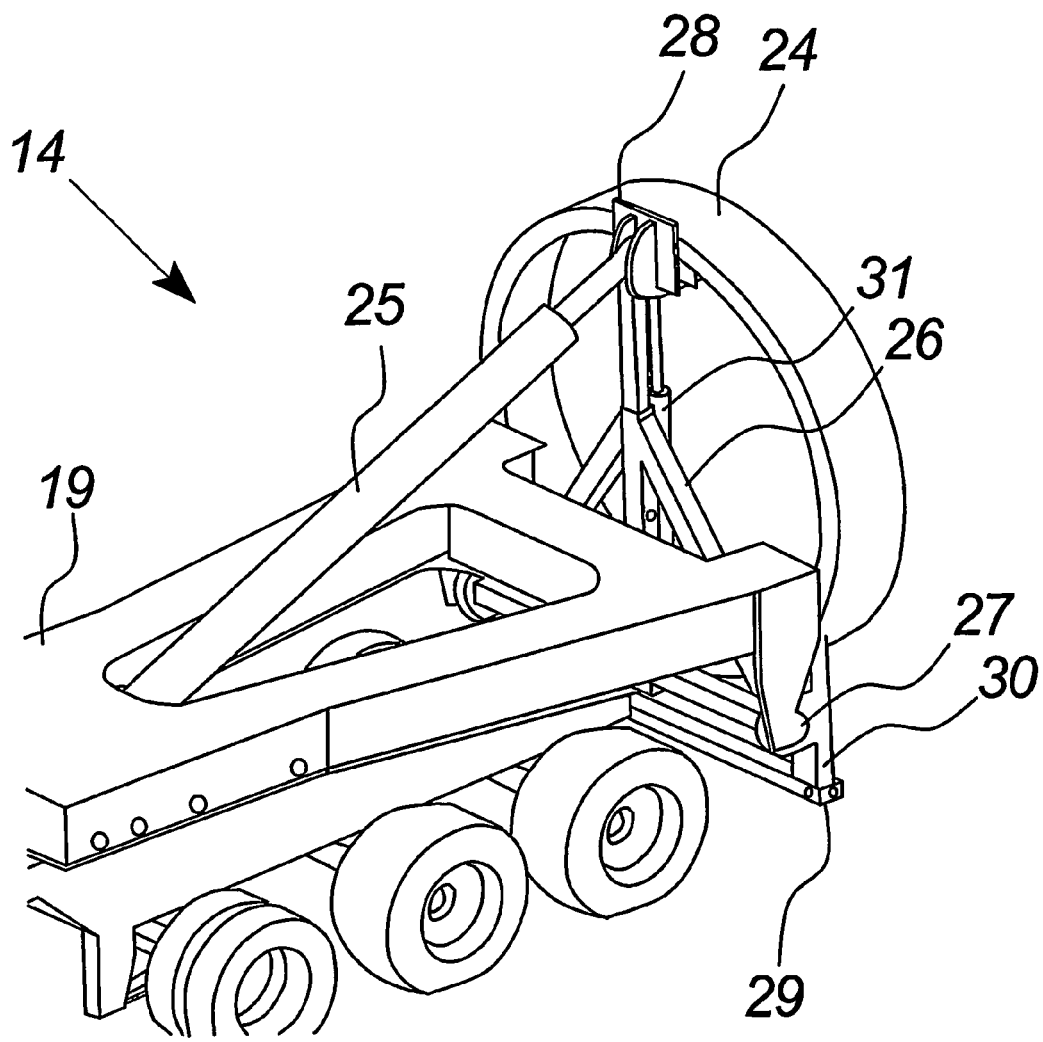
Figure 8:
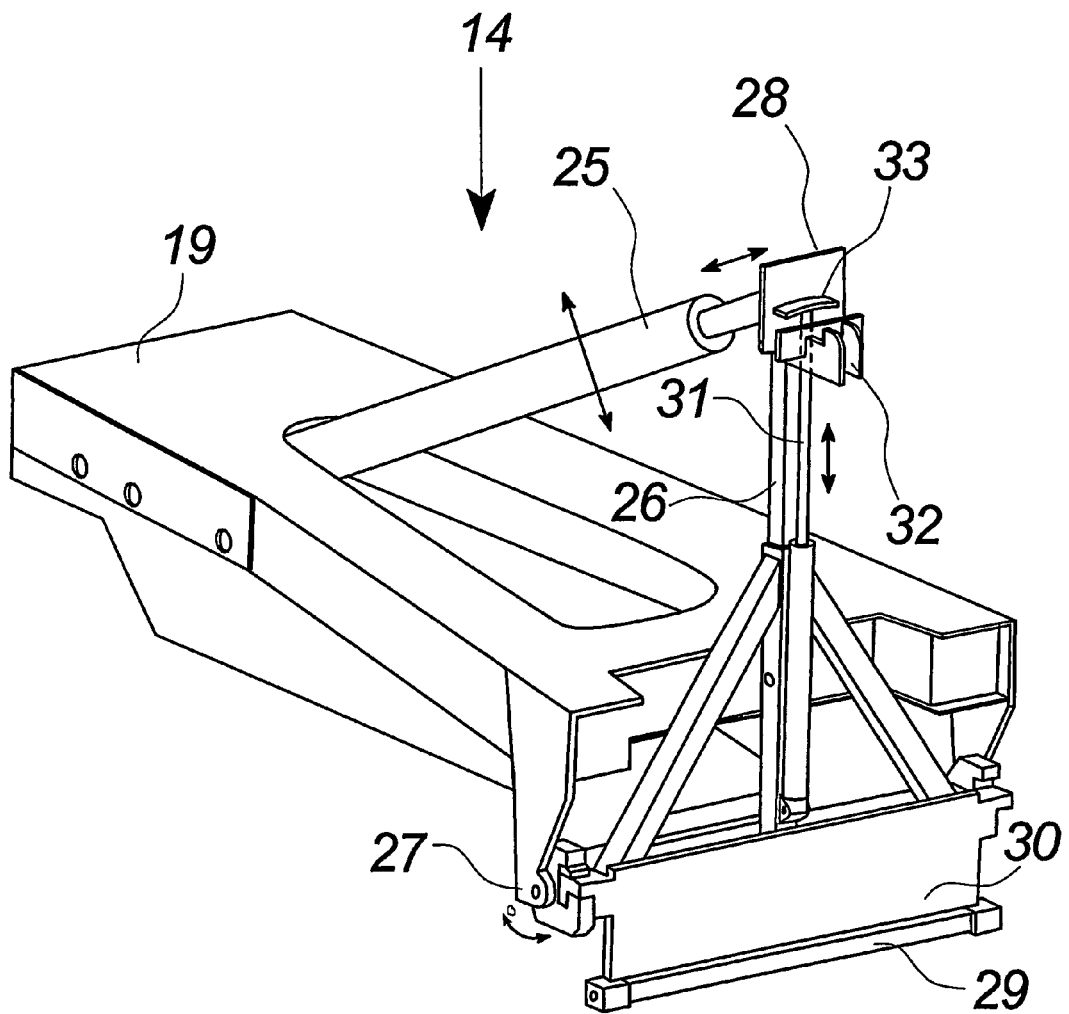
Figure 9:
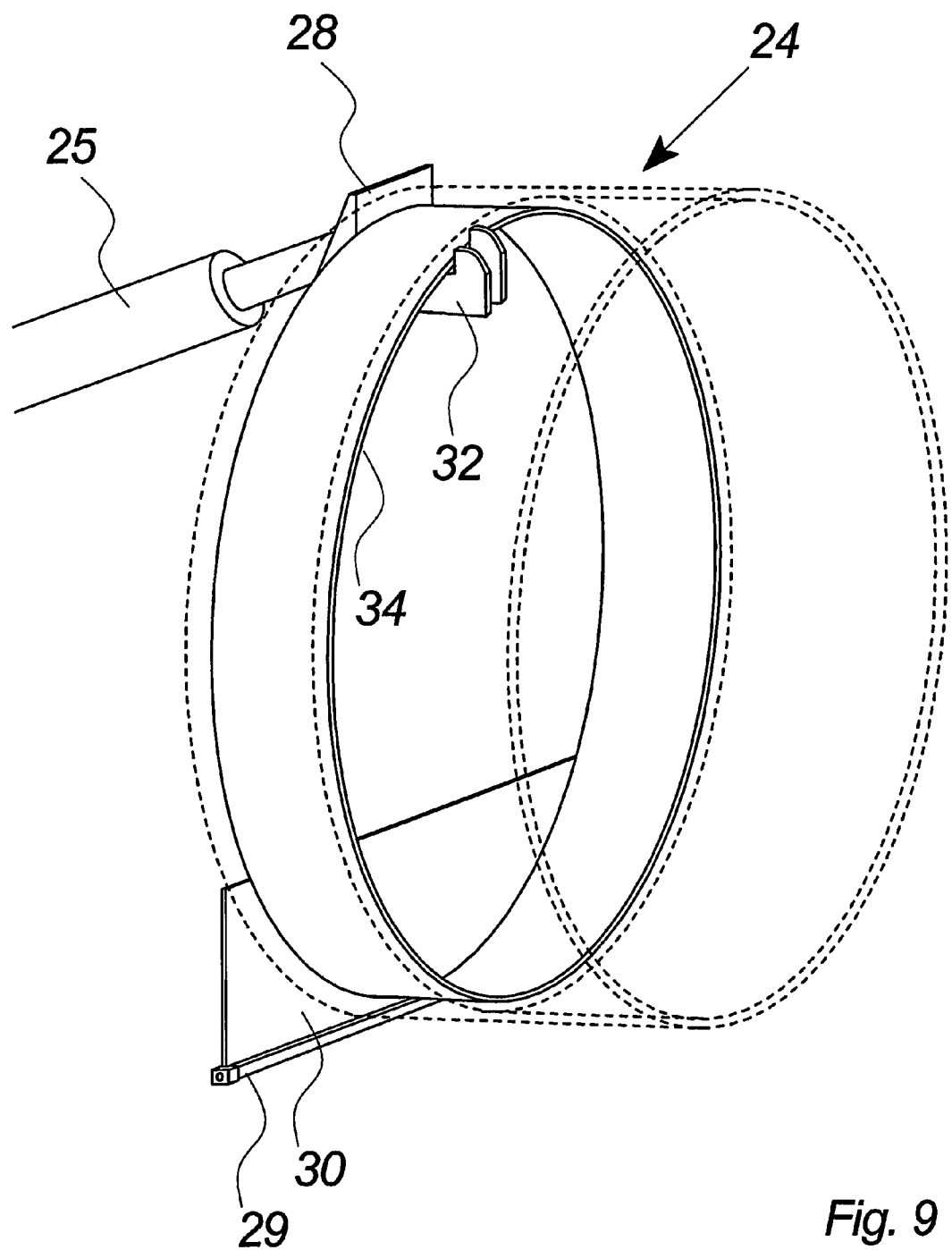
Figure 10:
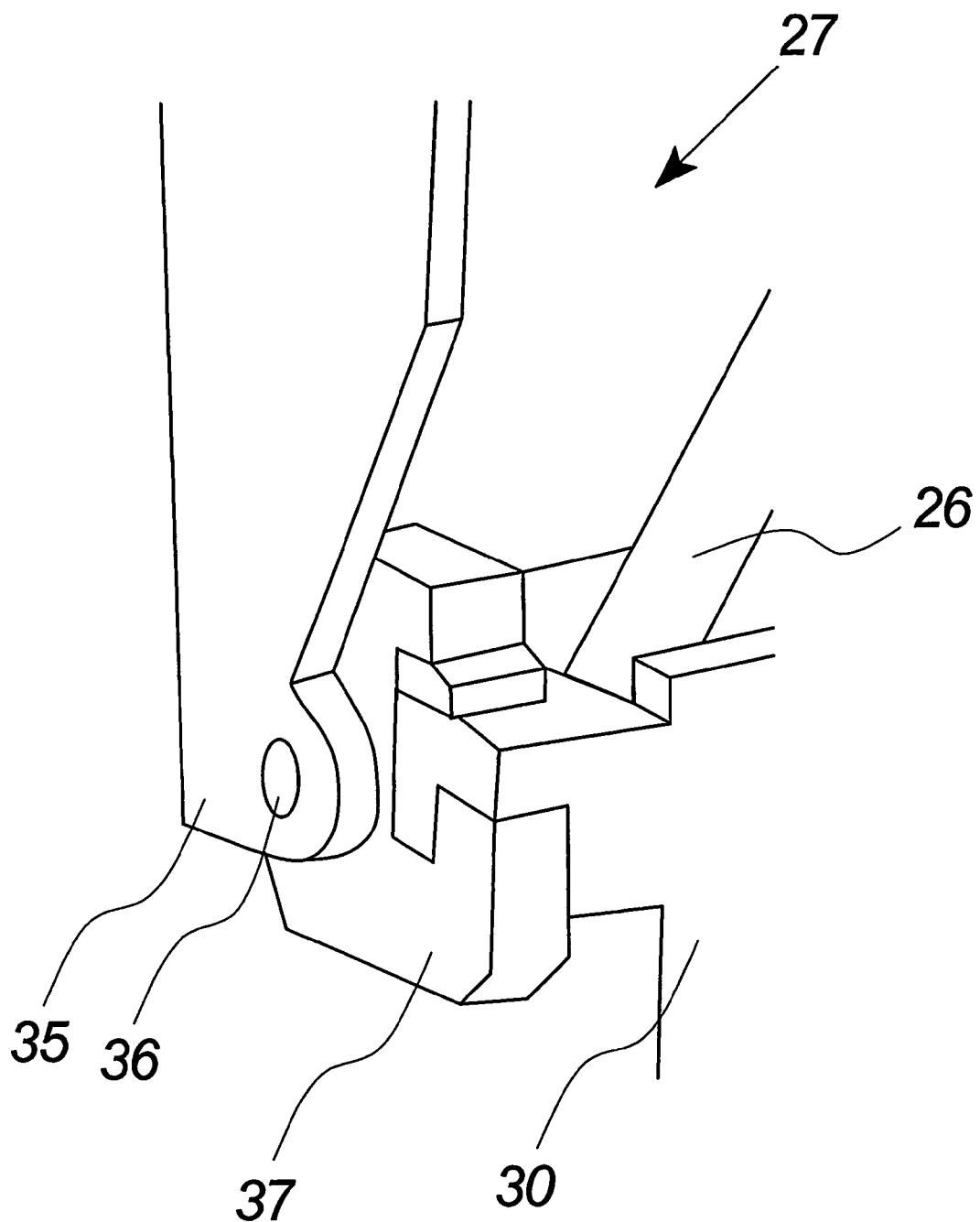
Figure 11:
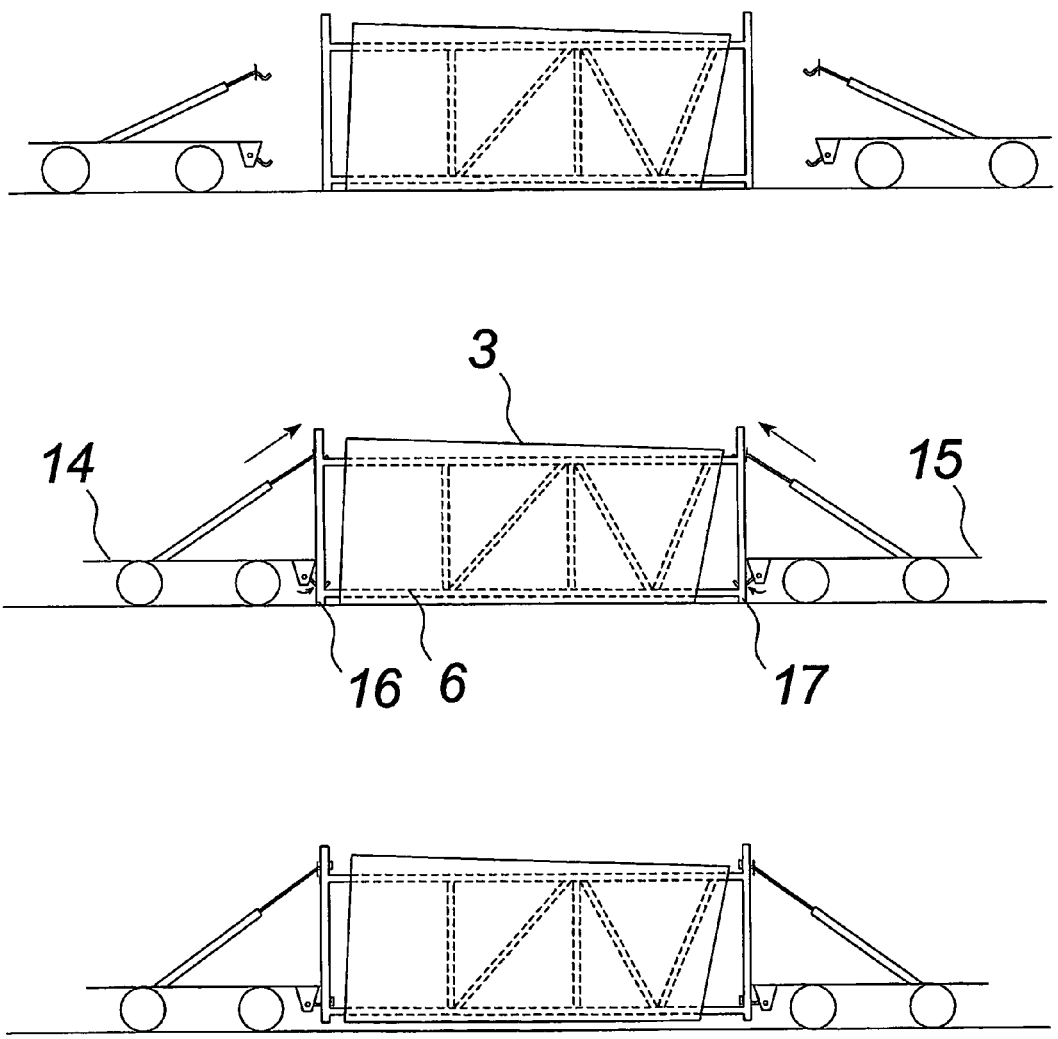
Figure 12:
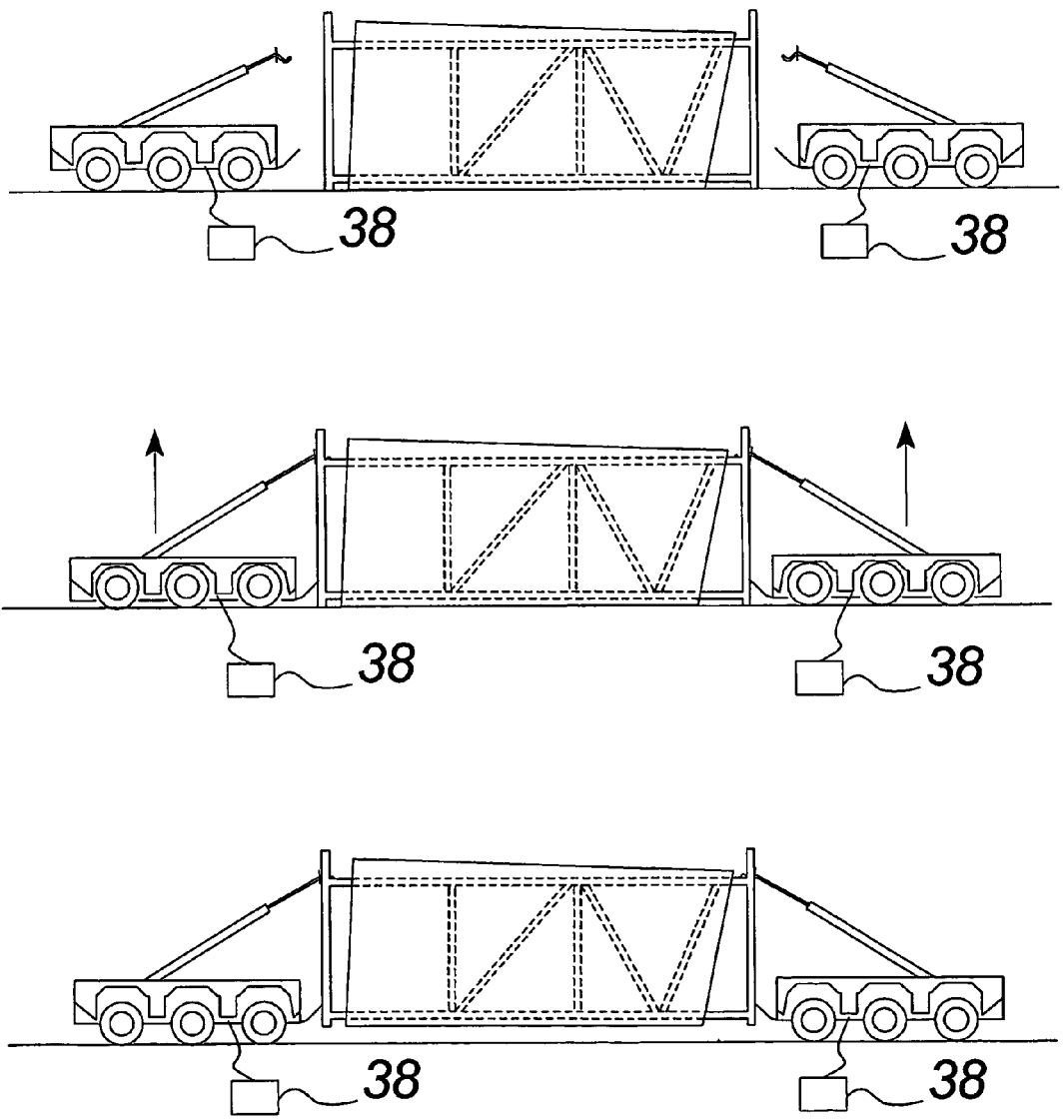

The invention will be described in the following with reference to the figures in which FIG. 1 illustrates a large modern wind turbine, FIG. 2 illustrates a cross-section of a wind turbine nacelle, FIG. 3 illustrates different sections of the basic structure of the nacelle, FIG. 4 illustrates a preferred embodiment of the transportation according to the invention of a wind turbine nacelle, FIGS. 5*a* and 5*b* illustrate the standardization of the wind turbine nacelle, FIG. 5*c* illustrates a sectional view of the transporting of a standardized wind turbine nacelle, FIG. 6 illustrates a further preferred embodiment of transportation according to the invention of a wind turbine nacelle, FIG. 7 illustrates a perspective view of a first connection vehicle for a wind turbine component, FIG. 8 illustrates another perspective view of the first connection vehicle of FIG. 7, FIG. 9 illustrates a circular lift adaptor for a wind turbine component, FIG. 10 illustrates a sectional view of the connection between the lift frame and the connection vehicle, and FIG. 11 illustrates schematically the functionality of a preferred embodiment of a transportation system for a wind turbine component, and FIG. 12 illustrates schematically the functionality of another embodiment of the transportation system.

DETAILED DESCRIPTION

FIG. 1 illustrates a modern wind turbine 1 with a tower 2 and a wind turbine nacelle 3 positioned on top of the tower. The wind turbine rotor 5, comprising three wind turbine blades, is connected to the nacelle through the low speed shaft which extends out of the nacelle front.

As illustrated in the figure, wind beyond a certain level will activate the rotor due to the lift induced on the blades and allow it to rotate in a perpendicular direction to the wind. The rotation movement is converted to electric power, which is usually supplied to the transmission grid as known by skilled persons within the area.

The different components of a wind turbine are usually transported separately to the site of mounting and assembled here e.g. the different tower sections, the nacelle and the wind turbine blades.

FIG. 2 illustrates a cross-section of a wind turbine nacelle. The illustrated nacelle 3 comprises a basic structure represented by a bolted, welded or molded machine frame 6 on which the main structures of the wind turbine are founded or suspended. Such main structures or components may e.g. include the hub 4, the generator, the yaw mechanism including the yaw foundation 8, the rotor shaft, gear means, etc. The machine frame is also provided with cover plates 10, such as steel or glass fiber plates, in order to establish the exterior surface of the nacelle. The cover plates 10 are only illustrated partly (in this and some of the following figures) in order to reveal the interior of the nacelle including the machine frame 6.

The nacelle 3 comprises upper and lower engagement arrangements 7a and 7b in the four corners of the rear side of the nacelle. The arrangements allow external structures to engage with the bolted, welded or molded machine frame 6 after entering the nacelle through openings in the cover plates 10. The engagement arrangements are either included in or fitted to the basic structure.

Moreover, the nacelle 3 is mounted with a sub-cover 9 adapted for protecting the sub-portion of the nacelle 3 against scratches etc. during transportation and storage.

Another embodiment of a wind turbine nacelle may comprise the use of a tubular or a similar shaped nacelle. The tubular nacelle may be constructed with less or no internal machine frame structure in which the surface plates establish the necessary strength in the frame structure.

FIG. 3 illustrates different sections of the basic structure of the nacelle 3. The structure of the figure only comprises the leftmost section of the above mentioned machine frame 6 ending just before the foundation 8 of the yaw mechanism (for illustrative purpose). The foundation 8 is suspended to the machine frame 6, together with other main structures or components (not illustrated in the figure). The sub-cover 9 is suspended to the yaw foundation 8 or directly to the machine frame 6.

The machine frame 6 is illustrated as horizontal steel I-beams 6a defining the sides of the nacelle. The frame preferably comprises at least four horizontal steel I-beams as is apparent from FIGS. 2 and 3. A number of vertical and diagonal steel beams 6b, 6c connect the different horizontal beams in order to strengthen the machine frame structure.

Further, the figure comprises a ring illustrating the front opening 11 in the nacelle for the later receiving of the hub 4. The opening 11 is connected to the machine frame directly at the beam ends or indirectly e.g. through the yaw foundation. The dotted plate 12 beneath the opening 11 schematically illustrates a section of the floor of the nacelle.

FIG. 4 illustrates a preferred embodiment of transportation according to the invention of a wind turbine nacelle. The embodiment includes a truck 13 pulling two trailers in which the trailers are a first and second connection vehicle 14, 15 for a wind turbine component. Each of the trailers comprises a trailer lift frame 19, 20 in order to lift the wind turbine component from the ground.

The wind turbine component may e.g. be a nacelle 3, a tower section or a hub 4 that is suspended between the two vehicles. The present embodiment is a nacelle (without the hub mounted) that is suspended between the two vehicles.

The suspending is preferably achieved with a first and second frame standardization means 16, 17 or frame elements engaging the wind turbine component and the trailers. The engaging of the illustrated nacelle may be directly or indirectly to the machine frame 6. The indirectly connection to the machine frame may be established by using the nacelle opening or the yaw foundation as connection points as they both are mounted on the machine frame.

The rear connection between the machine frame 6 and the second frame standardization means 17 is preferably achieved by entering steel beams or connection arms at the corners through small openings in the nacelle cover plates 10. Inside the nacelle the steel beams or connection arms are connected to the flanges of the horizontal beams with adaptors or furnishings bolted to both of the beams in question.

The front connection may also be achieved by beams entering the nacelle through small openings in the front of the nacelle in order to meet the machine frame 6. However, the preferred connection is achieved by a connection to or through the nacelle opening. One type of connection may be beams entering the opening in order to be directly or indirectly connected to the machine frame.

Another type may be a circular adaptor meeting the inside of the opening and bolted e.g. to the outer hub connection flange of the nacelle in which the nacelle may comprise a machine frame or be a tubular nacelle as described above.

Interconnecting the means with temporary transportation steel beams may further strengthen the structure comprising the first and second frame standardization means and the wind turbine component. The beams may connect the means through the wind turbine component or connect by extending on the outside of the component.

FIGS. 5a and 5b further illustrate the standardization of the wind turbine nacelle with the first and second frame standardization means 16, 17.

FIG. 5a illustrates schematically the connection between the first frame standardization means 16 (illustrated with dotted lines) and the nacelle.

The connection is for illustrative purpose shown as an upper and two side beams. The upper beam 22b directly meets an upper horizontal beam of the machine frame through the opening 11 of the nacelle. The first side beam 22a meets a vertical beam and the second beam 22b is connected to the yaw foundation 8 that is connected to the machine frame.

In a preferred embodiment the beams of the first frame standardization means 16 will connect the machine frame in the same way e.g. all beams directly to the frame or all opposite beams to the same structure of the nacelle such as the yaw mechanism or the machine frame. Further, the number of connections may be different e.g. three, four or more beams such as an upper/a lower as well as side beams.

The figure further illustrates the connection between a second frame standardization means 17 (also illustrated with dotted lines) and the rear of the nacelle 3. The means 17 is connected to the machine frame as described above with horizontal beams 17b. The beams are connected with further beams 17a all together creating the second frame standardization means 17.

FIG. 5b also schematically illustrates the connection between the first and second frame standardization means and the nacelle. The nacelle is illustrated as a more or less four-sided block between the two frame standardization means illustrated as end walls. The end walls define a four-sided space capable of enclosing the wind turbine component such as a nacelle, a tubular nacelle or a tower section e.g. a steel or concrete conical section of a modern wind turbine tower. The wind turbine component establishes the necessary rigid connection between the two end walls. The end walls on the other hand establish the outer standardized boundaries allowing other wind turbine component with the same type of end walls to be positioned below or on top of the present wind turbine component in which only the walls rest on each other.

In a preferred embodiment the end walls and the enclosed space corresponds to a standardized container in size such as a 20 feet, a 40 feet or a standard oversized shipping container. With the standardized size it is possible to transport and handle the wind turbine components as any other container in container transportation by ship, train or truck. As the upper and lower beam in the end walls also correspond to a standard container, it is possible to use standard lashing equipment such as twistlocks and lashing bars.

FIG. 5c illustrates a sectional view of the transporting of a standardized wind turbine nacelle by truck.

With the dotted line connecting the corners of the first and second frame standardization means 16, 17, it is illustrated that the means as end walls define a four-sided space capable of enclosing the wind turbine component. The upper and lower beams (starting points for the dotted lines) of the means are further illustrated as the standard beams of a shipping container including the openings for the above mentioned lashing equipment.

The first and second frame standardization means 16, 17 are connected to the first and second connection vehicle for a wind turbine component 14, 15. The connections are established at the lower ends with hinged connections 27 and at the upper ends with lift actuators allowing the wind turbine component to be lifted from the ground.

FIG. 6 illustrates a further preferred embodiment of transportation according to the invention of a wind turbine nacelle.

The embodiment especially facilitates a mechanical four-point coupling of the machine frame 6 to the frame attachment arrangement 23. The frame attachment arrangement 23 is connected to the second connection vehicle 15 with a lower hinged connection (corresponding to the hinged connections 27 in functionality) and a first lift actuator. The lift actuator may be connected to the frame attachment arrangement or directly to the machine frame of the nacelle.

However, the figure also illustrates a first frame standardization means 16 comprising an upper and lower horizontal standardization beam suspended in between vertical beams defining an end wall. The lower end of the end wall is connected to the vehicle in a hinged point. The upper end of the end wall is connected to a first lift actuator by gripping means including jaws gripping the underside of the upper standardization beam.

FIG. 7 illustrates a perspective view of a first connection vehicle for a wind turbine component.

The view shows the first trailer lift frame 19 of the first connection vehicle for wind turbine component 14. The wind turbine component is held by the circular lift adaptor 24 to engage the hub opening in the nacelle or the one opening of a tower section. The adaptor is preferably also bolted to the wind turbine component e.g. on the outer surface of the nacelle or internally to the machine frame.

The adaptor is attached to and lies against a connection plate 30 of the first standardization means 16. The connection plate ends in a lower standardization beam 30 and is further connected to the lift frame 19 and the vehicle 14 by a hinged connection 27. The upper standardization beam is not illustrated on the figure but may be attached to the lower beam with vertical beams or just to the upper part of the adaptor.

The figure further illustrates the fixed lift frame 26 connected to the connection plate 30 at bottom as well as the second lift actuator 31. The second lift actuator is positioned substantially parallel with the fixed lift frame 26 and engages with the inner surface of the adaptor 24 through the gripping means 28. The gripping means is positioned at the end of the arm of the first lift actuator 25 and grips an inner edge of the adaptor allowing the distance between the lift frame and the upper part of the adaptor 24 to be changed while turning around the hinged connection 27.

FIG. 8 illustrates another perspective view of the first connection vehicle of FIG. 7. The view especially illustrates (with arrows) the possible moving directions of the different components of the vehicle 14. As stated above the hinged connection 27 allows the vehicle to turn in relation to the first frame standardization means.

Further, the first lift actuator allows the distance between the adaptor (not illustrated in the figure) and vehicle to be changed. The vertical second lift actuator 31 is connected to the lift frame 26 in a fixed connection point. The second lift actuator ends in a contact face 33 that allows the adaptor to be firmly suspended in relation to the lift frame 26. The arm of the second lift actuator penetrates up through the jaws 32 of the gripping means 28 before ending in the contact face 33. The jaws 32 comprise two vertical steel plates that each ends in an edge directed upward. The plates are held in place by another vertical but perpendicular plate in relation to jaw plates in which the perpendicular plate is attached to both the jaw plates.

The figure also illustrates a connection plate 30 in which the plate may be connected to the adaptor e.g. in a welded or bolted connection. The lower edge of the plate ends in a standardization beam 29 defines the lower limit of the first standardization means 16.

FIG. 9 illustrates a circular lift adaptor for a wind turbine component. The adaptor 24 comprises an inner ring forming an inner gripping edge 34 that the gripping jaws 32 may engage. The adaptor also comprises an outer ring (illustrated with dotted lines) expanding from the inner ring and establishing the adaptor in full.

The use of gripping jaws and contact face makes it possible to easily disengage the wind turbine component with the first and second standardization means 16, 17 from the two vehicles. After the disengagement the wind turbine component with the first and second standardization means 16, 17 may be moved to another transportation e.g. from truck to ship transportation.

The figure also illustrates the connection between the lower standardization beam 29, the connection plate 30 and the front of the adaptor. However, in another embodiment the connection plate 30 may be replaced with two diagonal beams connecting the lower standardization beam with the side of the adaptor as well as the hinged connection 27.

FIG. 10 illustrates a sectional view of the connection between the lift frame and the connection vehicle. The view especially illustrates the hinged connection and the possibility of disengaging the wind turbine component with the first and second standardization means 16, 17 from the two vehicles. The disengagement may be performed by removing the wedge (also illustrated in FIG. 8) and lifting the connection plate out of the holding plate 37 in the hinged connection 27 allowing the movement around the turning shaft 36. The turning shaft connects the holding plate of the first or second standardization means and the vehicle represented by the side plate 35.

FIG. 11 illustrates schematically the functionality of a preferred embodiment of a transportation system for a wind turbine component e.g. as illustrated in FIGS. 4 and 10. FIG. 11 illustrates the method of lifting the wind turbine component including a first and second frame standardization means from the ground. The lowering of the wind turbine component to the ground may be achieved by reversing the method.

The method includes the steps of:

Positioning the first and second trailer in front of the wind turbine component with the first and second frame standardization means.

Connecting the first and second trailer to the first and second frame standardization means with gripping jaws engaging the frame standardization means at the top and bottom. The jaws of the lift actuators are connected at the top of the frame standardization means. Each of the jaws at the bottom of the standardization means comprises a pivoting hinge (e.g. hinge 27) establishing the connection to the associated trailer.

Raising the wind turbine component with the frame standardization means vertically by extracting the actuators upward.

Allowing the wind turbine component with the frame standardization means to be raised from the ground by pivoting in the hinges in which the jaws 0 at the bottom follow the component and means upwardly.

FIG. 12 illustrates schematically the functionality of another embodiment of the transportation system. The figure illustrates the method of lifting the wind turbine component including a first and second frame standardization means from the ground with the use of a suspension system of two trailers. The lowering of the wind turbine component to the ground may be achieved by reversing the method.

The method includes the steps of:

Positioning the first and second trailer in front of the wind turbine component with the first and second frame standardization means.

Adapting the trailers to the lower position of the standardization means by letting hydraulic oil out of the suspension system or means 38 and thus changing the height of the trailers above the wheels.

Connecting the trailers to the standardization means with gripping jaws engaging the standardization means at the top and bottom. The actuators are rigidly connected at the top and the hinges at the bottom.

Raising the trailers to their normal position by pumping hydraulic oil into the hydraulic actuators of the suspension system again in which the trailers raise them self in relation to the wheels.

The wind turbine component with the standardization means will be lifted from the ground by the raising of the trailers as the actuators and the trailers form a rigid system. Also the wind turbine component and the standardization means form a rigid system.

Further, letting air in and out of the tires may be used in order to lower or raise the trailers or sections hereof e.g. one end if non-solid tires are used. Even further, the angling between the trailer frames and the actuators may be changed in order to achieve the lifting of the wind turbine component e.g. by changing the position of some wheels e.g. by lowering or raising the wheel shafts.

The invention has been exemplified above with reference to specific examples. However, it should be understood that the invention is not limited to the particular examples described above but may be used in connection with a wide variety of applications. Further, it should be understood that especially the connection between the trailers and the wind turbine component according to the invention may be designed in a multitude of varieties within the scope of the invention as specified in the claims.

LIST

1. Wind turbine
2. Wind turbine tower
3. Wind turbine nacelle
4. Wind turbine hub
5. Wind turbine rotor
6, 6a, 6b, 6c. Bolted, welded or molded machine frame, horizontal, vertical and diagonal beams of the machine frame
7, 7a, 7b. Engagement arrangements, upper and lower engagement arrangements
8. Yaw foundation
9. Sub-cover
10. Nacelle cover plates
11. Nacelle opening
12. Section of the nacelle floor
13. Truck
14. First connection vehicle for a wind turbine component
15. Second connection vehicle for a wind turbine component
16. First frame standardization means
17, 17a, 17b. Second frame standardization means,
18. First modular trailer
19. First trailer lift frame
20. Second modular trailer
21. Second trailer lift frame
22, 22a, 22b. Frame connection arms
23. Frame attachment arrangement
24. Circular lift adaptor
25. First lift actuator such as a hydraulic actuator
26. Lift frame
27. Hinged connection between vehicle and lift frame
28. Gripping means for the circular lift adaptor
29. Lower standardization beam
30. Connection plate for the circular lift adaptor
31. Second lift actuator such as a hydraulic actuator
32. Gripping jaws
33. Contact face of the second lift actuator
34. Inner gripping ring
35. Vehicle side plate
36. Turning shaft
37. Holding plate
38. Displacement means such as hydraulic actuators e.g. being a part of the suspension of a vehicle

The invention claimed is:

1. Transportation system for a wind turbine component, said system comprising:
   a wind turbine component with a rigid structure;
   at least two frame elements connected to opposite ends of the rigid structure of said wind turbine component; and
   a truck and at least two trailers arranged for supporting said at least two frame elements such that the wind turbine component is suspended between said at least two trailers by the rigid structure and the frame elements;
   wherein said at least two frame elements define a space enclosing said component such that the component does not project beyond said space; and
   wherein said at least two frame elements are connected to said at least two trailers via one or more flexible connections;
   wherein each of said at least two frame elements comprises at least three connection arms or a circular lift adaptor connecting to the wind turbine component;
   wherein said at least one of said flexible connections comprises at least two lift actuators;
   wherein a first lift actuator supports a vertical lift frame and is arranged with a second lift actuator connected at one end to said lift frame and ending in a contact face at an opposite end; and
   wherein said first lift actuator and said contact face engage with an upper section of said at least two frame elements such that a distance between said lift frame and said upper section can be varied.

2. Transportation system according to claim 1, wherein said rigid structure comprises a bolted, welded or molded machine frame of a nacelle including horizontal, vertical and/or diagonal beams.

3. Transportation system according to claim 1, wherein said rigid structure comprises a tubular or similar structure of a wind turbine nacelle or tower section.

4. Transportation system according to claim 1, wherein said at least two frame elements define a space corresponding to a standardized container having the length of 20 to 40 feet.

5. Transportation system according to claim 1, wherein said at least two frame elements define a space corresponding to a standardized container having the length and width of 20 to 40 feet.

6. Transportation system according to claim 1, wherein each of said at least two frame elements includes an upper and lower frame beam.

7. Transportation system according to claim 1,
wherein said at least three connection arms or a circular lift adaptor are directly connected to a nacelle machine frame with adaptors or furnishings and bolts or indirectly through a hub opening or a yaw foundation of the nacelle.

8. Transportation system according to claim 1, wherein said one or more flexible connections comprise hinged connections between said at least two frame elements and said at least two trailers.

9. Transportation system according to claim 1,
wherein said first lift actuator includes gripping means with gripping jaws for gripping said at least two frame elements.

10. Transportation system according to claim 9, wherein said gripping means with gripping jaws engages with an inner gripping edge of said circular lift adaptor or a lower edge of an upper frame beam.

11. Transportation system according to claim 1,
wherein said contact face engages with an inner surface of said circular lift adaptor or a lower edge of an upper frame beam.

12. Transportation system according to claim 1, wherein said at least two frame elements are indirectly connected to the rigid structure of said wind turbine component.

13. Displacement system for a wind turbine component, said system comprising:
a gripping mechanism engaging with a wind turbine component including a rigid structure;
a displacement mechanism displacing said wind turbine component, said gripping and displacement mechanisms being connected; and
at least two frame elements;
wherein said displacement system is further connected to at least one of said at least two frame elements;
wherein said at least two frame elements are also connected to the rigid structure of said wind turbine component, via one or more flexible connections; and
wherein said at least two frame elements define a space enclosing said component such that the component does not project beyond said space;
wherein at least one of said flexible connections comprises at least two lift actuators;
wherein a first hydraulic actuator supports a vertical lift frame and is arranged with a second hydraulic actuator connected at one end to said lift frame and ending in a contact face at an opposite end; and
wherein said first hydraulic actuator and said contact face engage with an upper section of said at least two frame elements such that a distance between said lift frame and said upper section can be varied.

14. Displacement system according to claim 13, further comprising at least one hydraulic actuator suspending one or more wheels in relation to a trailer frame comprising the suspension system of a trailer or vehicle.

15. Displacement system according to claim 13, wherein said gripping mechanism comprises one or more gripping jaws.

16. Displacement system according to claim 13, wherein said at least two frame elements are indirectly connected to the rigid structure of said wind turbine component.

17. Method of establishing a transportation or displacement system for a wind turbine component, said method comprising:
positioning at least two frame elements in opposite ends of the wind turbine component;
connecting said at least two frame elements to a rigid structure of said wind turbine component via one or more flexible connections, each comprising at least two lift actuators, such that said at least two frame elements define a space enclosing said component so that the component does not project beyond said space; and
connecting said at least two frame elements to a truck and at least two trailers such that the wind turbine component is suspended between said at least two trailers;
wherein a first lift actuator is used to support a vertical lift frame and is arranged with a second lift actuator connected at one end to said lift frame and ending in a contact face at an opposite end; and
wherein said first lift actuator and said contact face are used to engage an upper section of said at least two frame elements such that a distance between said lift frame and said upper section can be varied.

18. Method of establishing a transportation or displacement system according to claim 17, wherein said wind turbine component and said at least two frame elements are lifted or displaced with at least two first lift actuators connecting said at least two trailers and said at least two frame elements.

19. Method of establishing a transportation or displacement system according to claim 18, wherein said wind turbine component and at least two frame elements are lifted or displaced by said at least two first lift actuators forcing in an upward direction and lowered by retracting said at least two first lift actuators in a downward direction.

20. Method of establishing a transportation system according to claim 19, wherein said lift or displacement further comprises turning said at least two trailers or wind turbine component with said at least two frame elements around hinged connections between the trailers and said at least two frame elements.

21. Method of establishing a transportation system according to claim 17, wherein said transportation system is lifted or displaced from or positioned on the ground by changing the level or angling of said at least two trailers.

22. Method of establishing a transportation system according to claim 21, wherein said transportation system is lifted or displaced from or positioned on the ground with the aid of hydraulic or pneumatic means.

23. Method of establishing a transportation system according to claim 17, wherein said transportation system is lifted from or positioned on the ground by changing a position of trailer tires in relation to the rest of said at least two trailers.

24. Method of establishing a transportation system according to claim 17, wherein said transportation system is lifted from or positioned on the ground by letting air out of or into trailer tires.

25. Method of establishing a transportation or displacement system for a wind turbine component according to claim 17, wherein said at least two frame elements are indirectly connected to the rigid structure of said wind turbine component.

* * * * *